United States Patent [19]

Winkelbauer et al.

[11] Patent Number: 5,188,989
[45] Date of Patent: Feb. 23, 1993

[54] COATING MIX TO PREVENT OXIDATION OF CARBON SUBSTRATES

[75] Inventors: Howard M. Winkelbauer, McKeesport; Eugene T. Rushe, Port Vue, both of Pa.

[73] Assignee: Dresser Industries, Dallas, Tex.

[21] Appl. No.: 127,268

[22] Filed: Dec. 1, 1987

[51] Int. Cl.⁵ ................................................ C03C 8/04
[52] U.S. Cl. ........................................ 501/17; 501/26; 501/32; 501/79; 501/100
[58] Field of Search .................. 501/17, 26, 99, 100, 501/79; 106/32

[56] References Cited

U.S. PATENT DOCUMENTS

| | | | |
|---|---|---|---|
| 2,063,252 | 12/1936 | Kinzie | 501/26 X |
| 2,269,176 | 1/1942 | Booth et al. | 501/26 X |
| 2,527,884 | 10/1950 | Kaufman | 501/26 X |
| 2,786,782 | 3/1957 | Zimmerman et al. | 501/26 X |
| 3,939,295 | 2/1976 | Robertson et al. | 501/17 X |
| 4,088,502 | 5/1978 | LaBar . | |
| 4,340,645 | 7/1982 | O'Connor | 501/26 X |
| 4,361,654 | 11/1982 | Ohmura et al. | 501/26 X |
| 4,540,675 | 9/1985 | Morris et al. | 501/99 OR |

FOREIGN PATENT DOCUMENTS 1593351 7/1981 United Kingdom .

OTHER PUBLICATIONS

Manson, "The Use of Bentonite for Suspending Enamels", J. of Am. Cerm. Soc., 6 pp. 790-793 (1923).
The Condensed Chemical Dictionary, Hawley, (1971) p. 417.

*Primary Examiner*—Karl Group

[57] ABSTRACT

An oxidation-resistant carbon-containing refractory shape having on the surface thereof exposed to oxidation an oxidation-resistant glaze coating, said glaze coating consisting essentially of the reaction product of a zinc borosilicate frit and a clay; and the method of forming said coating on a refractory shape comprising applying to at least a portion of the shape an aqueous suspension of a fluxed mix consisting essentially of a zinc borosilicate and a clay, drying said coating, and firing said coated refractory shape at a temperature and for a time sufficient to cause the borosilicate and clay in said mix to react and form a substantially uniform glaze coating.

6 Claims, No Drawings

COATING MIX TO PREVENT OXIDATION OF CARBON SUBSTRATES

BACKGROUND OF THE INVENTION

Carbon occurs in a variety of forms in many refractory and ceramic shapes which are used to either contain molten metals and slags or to provide a shield from intense heat. For example, carbon added to a shape can occur in a range of sizes from additions of sub-micron carbon black to large 1 to 2 mm particles of petroleum coke or flake graphite. Carbon can also occur in the form of pore filling carbon derived from tar or pitch impregnation of a sintered or coked refractory shape. In addition, carbon often occurs as the bonding material in many refractories. This form of carbon is derived from high carbon-yielding resins or from molten tar or pitch. After shape forming, the refractories are heated under reducing conditions at temperatures over 1000° F. This treatment removes the light hydrocarbons from the carbon precursor and leaves a carbon residue which forms a bridging network. This network provides a means of providing strength to the shape.

Carbon has many useful purposes. It is often added to a refractory or ceramic to increase its thermal or electrical conductivity or to provide a nonwetting barrier to the intrusion of molten slag or corrosive gases.

A fundamental problem with any refractory shape which contains carbon is oxidation. Depending on the size of the carbon particle, oxidation can begin as low as 500° F. or less. Most carbon-containing shapes are used at much higher temperatures, often at 3000° F. or higher. As temperature and time increase carbon becomes increasingly vulnerable to gaseous removal by oxidation. Loss of carbon through oxidation limits the service life of the refractory and defeats the intended purpose of adding carbon to the shape. Furnace operators often employ schemes to limit carbon oxidation, such as preheating under reducing conditions, and refractory manufacturers often add fine metals like silicon or aluminum to limit oxidation. These efforts, however, do not entirely prevent oxidation.

Other efforts to overcome this problem have included use of protective coatings, such as alkali silicate, lead silicate, and numerous other materials in order to prevent oxidation of the carbon in the refractory or ceramic-shape articles. These have not proven satisfactory and the refractory shapes, particularly the bricks, still suffer undesirable weight losses when exposed to the conditions to which they are utilized; such as the high temperatures in process furnaces.

SUMMARY OF THE INVENTION

The present invention provides a novel coating for carbon-containing shapes, as well as novel oxidation-resistant refractory shapes, which exhibit only a slight decrease in weight loss due to oxidation of carbon.

Briefly, the present invention comprises a carbon-containing refractory shape having thereon an oxidation-resistant glaze consisting essentially of, the reaction product of a zinc borosilicate frit and a clay. The invention also comprises a novel oxidation-resistant coating mix and a method of forming the oxidation-resistant carbon-containing shape as hereinafter set forth.

DETAILED DESCRIPTION

As used herein, the term "glaze" refers to the vitreous coating formed on the refractory shape by the reaction between the zinc borosilicate and clay. Also, the term "fluxed" as applied to the mixture used to form the glaze means that it contains sufficient amounts of the substances that assist the fusing of the minerals necessary to form the glaze. Examples of such substances are silica and boron.

It has been noted that certain zinc borosilicate frits as commercially available are sufficiently fluxed whereas others are not. In the latter case, the fluxed condition can be attained by addition of minor amounts of such known fluxing substances as silica, boron, and the like. In some instances the clay used may even contain a sufficient amount of the fluxing substances to overcome the amount lacking in a particular zinc borosilicate.

As to the carbon-containing refractory shapes that are coated, any of those conventionally utilized in various metal-making and other operations where refractories are used can be used in the present invention; the most common are tar or pitch-impregnated carbon-bonded bricks. It has been noted that, while any refractory shape can be utilized, the present invention is relatively ineffective on shapes which contain high levels of flake graphite. The present invention is clearly applicable and effective on carbon or ceramic bonded shapes which are either tar or pitch impregnated and coked or shapes which contain wettable forms of carbon, such as fluidized bed coke, and with refractories containing low levels of flake graphite.

The essential part of the refractory of the present invention is the oxidation-resistant glaze coating and this consists essential of the reaction product of two essentially components; namely, a zinc borosilicate frit and a crude clay. These two react at the temperatures to which the refractories are exposed to form a hard glaze.

The mix from which the glaze is formed comprises primarily the zinc borosilicate frit which is present in an amount of about 90% by weight with the balance being any conventional clay used in forming ceramics such as crude ball clay. The clay and the frit should preferably be essentially fine $-325$ mesh powders and as noted above properly fluxed.

Conventional thickening and suspension agents are added, such as, respectively, organo-bentonite and carboxymethyl-cellulose. They are added in their usual amounts; namely, levels of about 0.1% by weight for each 100 parts by weight of the mix and for their usual effect. In order to impart a handling strength and adhesiveness to the coating, it is preferred to add a room-temperature setting film-forming binder to the mix of the zinc borosilicate frit and clay. Preferably used are water-soluble acrylic resins such as conventionally used in making latex paints at a level of about 4 to 5% by weight, based on 100 parts by weight of the mix. Other synthetic and naturally occurring resins and other materials capable of forming room-temperature setting films can also be utilized. The film-forming binder acts to adhere the mixture of zinc borosilicate and clay on the refractory shape and to impart acceptable handling strength to the dried coating before heating to form the glaze. Other conventional materials, such as defoamers to enhance coating density may also be added.

While the protective glaze coating can be applied to the shape by a variety of techniques, such as by dipping or brushing, it is preferred to apply it by spraying and to ensure a uniform coating thickness. Preferably, the thickness of the coating on the refractory should be about 1/32 of an inch. Liquid diluents, such as water, are utilized in order to obtain the desired spraying or dip consistency. For this purpose, about 50 to 60% by weight of water is preferably added to form a water suspension of the mix materials.

Spraying, dipping, or other technique of applying the coating is carried out so as to ensure that those surfaces of the brick exposed to oxidation are coated to minimize any possibility of oxidation of the carbon in the pores of the brick.

After the coating is applied it is dried by heating to about 200° to 250° F. and then fired at a temperature sufficient to cause the fluxed zinc borosilicate and clay to react and form the glaze. The precise firing temperature and time will vary dependent upon the particular coating composition, but generally a temperature about 1000° to 2000° F. is adequate to melt the reactants and form the glaze. The film-forming binder added will survive the drying temperatures but will be decomposed at the firing temperatures and be dissipated after completing its function of keeping the reactants in place as a uniform coating on the refractory shape to form a substantially uniform glaze coating free of pin holes or other irregularities that could not protect against oxidation.

If desired, the refractory shapes, such as brick, can be installed by the masons in the metallurgical vessel, for example, and then a water suspension of the coating glaze mix sprayed onto the exposed brick surfaces, the coating dried, and the glaze formed by heating the vessel. This eliminates the need for coating all surfaces of the brick prior to use and also avoids any damage to the glaze coating of the brick; that could negate oxidation resistance, due to handling subsequent to formation of the glaze as during transportation and installation.

The invention will be further described in connection with the following examples which are set forth for purposes of illustration only.

EXAMPLE 1

Comparative

Table I below shows eight different coating mixes which were prepared with a borosilicate frit. These mixes were prepared with and without additives such as crude clay and silica which are known additives which impart body to a glaze. In addition, various conventional suspension and wetting agents were added to the mixes. Coked, tar impregnated carbon-bonded alumina refractory shapes were coated by dipping them into the mixes. The shapes were slowly dried to 250° F. and then fired at 200° F./hr to 1800° F. (15 min. hold) which was necessary to melt the frit and clay/silica thereby producing a glaze covering. After firing, all of the shapes, regardless of the composition of the mix appeared similar. They all had numerous pin holes in the glaze and large areas on the shapes were not covered by glaze. It appeared that during wetting the glaze had "crept" away from certain areas. The uncovered areas of the samples were round with thick glaze buildup at their rims.

TABLE I

| Frit: | A | | | | B | | | |
|---|---|---|---|---|---|---|---|---|
| Mix No. | 1 | 2 | 3 | 4 | 5 | 6 | 7 | 8 |
| Type: | Borosilicate | | | | | | | |
| Mix Composition: | | | | | | | | |
| Borosilicate Frit | 100% | 100% | 90% | 90% | 95% | 95% | 90% | 90% |
| Gleason Ball Clay | — | — | 10 | 10 | — | — | 10 | 10 |
| Potters Flint, −200 m | — | — | — | — | 5 | 5 | — | — |
| Plus Additions: | | | | | | | | |
| O. Hommel Compound 7021 (organo-bentonite) | — | — | 0.1 | 0.1 | 0.05 | 0.05 | — | — |
| SPV Bentonite | 1 | 1 | — | — | — | — | — | — |
| Methocel F4M | 0.2 | 0.2 | — | — | — | — | — | — |
| CMC −7M (carboxy-methylcellulose) | — | — | 0.2 | 0.2 | 0.2 | 0.2 | 0.1 | 0.2 |
| O. Hommel Wetting Agent (SC-650-A) | — | — | — | — | — | — | — | 1.0 |
| Water | 60 | 60 | 74 | 74 | 74 | 74 | 60 | 70 |

EXAMPLE 2

Comparative

Other borosilicates were investigated (Table II). Seven mixes were also prepared in the usual manner and applied to coked, tar impregnated carbon-bonded alumina shapes by dipping the shapes in the diluted coating mixes. Various heat treatments ranging from heat-up rates from 200° to 400° F./hr to peak temperatures of 1850° or 2000° F. were given to the coated samples. Kiln atmospheres were either oxidizing or inert which was accomplished by maintaining the furnace under a positive nitrogen pressure. All of the coatings on the shapes after these various heat treatments were unsatisfactory. The sub-surfaces were either oxidized or the coating did not uniformly cover the surfaces. Mix 15, which consisted of a low melting lead borosilicate was dipped as well as sprayed onto the carbon-containing substrates. After drying, the coated shapes were given a heat treatment of 200° F./hr to 1300° F. (15 min. hold) in a nitrogen atmosphere. It was apparent that the shapes which had been sprayed rather than dipped had a more uniform coating, but there were still persistent areas on the shapes where the glaze was absent. A problem with the prior coating mixes was poor handling strength after drying. An addition of 4% Rhoplex AC 33, a water soluble acrylic resin, was sufficient to impart acceptable handling strength to the dried coating.

TABLE II

| Frit: | C | D | E |
|---|---|---|---|
| Mix No. | 9 10 11 | 12 13 14 | 15 |
| Type: | Barium Borosilicate | Lead Borosilicate | Lead Borosilicate |
| Mix Composition: | | | |
| Frit | | 90% | |
| Gleason Ball Clay | | 10 | |
| Plus Additions: | | | |
| O. Hommel Compound 7021 | | 0.1 | |
| CMC −7M | | 0.1 | |
| Rhome & Haas Rhoplex | — — — — — — | | 4 |

TABLE II-continued

| Frit: | C | | | D | | | E |
|---|---|---|---|---|---|---|---|
| Mix No. | 9 | 10 | 11 | 12 | 13 | 14 | 15 |
| Type: | Barium Borosilicate | | | Lead Borosilicate | | | Lead Borosilicate |
| AC 33 | | | | | | | |
| Water | 60 | 70 | 60 | 60 | 60 | 60 | 60 |

EXAMPLE 3

Comparative

Similar investigations as in Examples 1 and 2 were conducted using sodium borosilicate and lead silicate frits (Table III). The coated shapes were heat treated at 200° F./hr to 1300° F. (15 min. hold) in a nitrogen atmosphere. The glazed shapes were like the prior samples; they all had a nonuniform coating.

TABLE III

| Frit: | F | G |
|---|---|---|
| Mix No. | 16 | 17 |
| Type: | Sodium Borosilicate | Lead Silicate |
| Mix Composition: | | |
| Frit | 90% | |
| Gleason Ball Clay | 10 | |
| Plus Additions: | | |
| O. Hommel Compound 7021 | 0.1 | |
| CMC —7M | 0.1 | |
| Rhoplex AC 33 | 4 | |
| Water | 60 | |

EXAMPLE 4

Table IV shows the development of eight mixes based on a zinc borosilicate frit. Mixes 18 to 20 had increasing levels of Rhoplex AC 33. It was apparent that only Mix 21 which contained 4% Rhoplex AC 33 had sufficient handling strength after drying. The coating without a Rhoplex AC 33 addition easily rubbed off after drying. As in the prior examples, carbon-containing refractory shapes were coated by dipping or spraying frits H and I onto the substrates, drying the coated shapes, and firing them at 200° F./hr to 1300° F. in a nitrogen atmosphere. After this treatment an unexpected result was seen. The shapes which had been coated with Frit I were completely and uniformly covered with glaze whereas shapes coated with Frit H, a less fluxed zinc borosilicate, were like all the prior samples which exhibited a nonuniform coating.

Shapes coated with Mix I were exposed to an oxidation test. It was shown that a shape which had been coated with Frit I only showed 2.7% weight loss; whereas, an uncoated shape of the same composition showed 10.3% weight loss in the same test. For comparison, coated shapes were heat treated at 500° F./hr to 1800° F. in an oxidizing atmosphere (which is a more typical heat-up condition in many refractory applications). These shapes also showed similar results to those coated shapes which had been fired at 1300° F. in a protective nitrogen atmosphere to develop the glaze coating.

TABLE IV

| Frit: | H | | | I | | | | |
|---|---|---|---|---|---|---|---|---|
| Mix No. | 18 | 19 | 20 | 21 | 22 | 23 | 24 | 25 |
| Type: | Zinc Borosilicate | | | | | | | |
| Mix Composition: | | | | | | | | |
| Frit | 90% | | | | | | | |
| Gleason Ball Clay | 10 | | | | | | | |
| Plus Additions: | | | | | | | | |
| O. Hommel Compound 7021 | 0.1 | | | | | | | |
| CMC —7M | 0.1 | | | | | | | |
| Rhoplex AC 33 | 0 | 1 | 2 | 4 | 4 | 4 | 4 | 4 |
| Hagan Defoamer, HP | — | — | — | — | — | — | — | — |
| Water | 60 | | | | | | | |

EXAMPLE 5

Additional studies were conducted on seven mixes to determine if Mix 24 could be optimized further by decreasing the clay content of the mix or by adding either starch or Epsom salts to the base mix. It was found that starch additions were impractical because they tended to cause clogging of the spray gun and coatings which contained Epsom salts tended to foam during heat treatment. Mixes 27 to 29 which contained 10% ball clay and 4% Rhoplex AC 33 appeared to have the best overall set of properties. These mixes consistently provided thin, uniform coatings on various types of carbon-containing refractories with the exception of refractories which contained more than a few percent of flake graphite. The results are shown in Table V.

TABLE V

| Frit: | I | | | | | | |
|---|---|---|---|---|---|---|---|
| Mix No. | 26 | 27 | 28 | 29 | 30 | 31 | 32 |
| Type: | Zinc Borosilicate | | | | | | |
| Mix Composition: | | | | | | | |
| Frit | 95% | 90% | 90% | 90% | 95% | 95% | 95% |
| Gleason Ball Clay | 5 | 10 | 10 | 10 | 5 | 5 | 5 |
| Plus Additions: | | | | | | | |
| O. Hommel Compound 7021 | 0.5 | 0.1 | 0.1 | 0.1 | 2 | 2 | 2 |
| CMC —7M | 0.2 | 0.1 | 0.1 | 0.1 | 1 | 1 | 1 |
| Rhoplex AC 33 | 2 | 4 | 4 | 4 | 2 | 2 | 2 |
| Hagan Defoamer, HP | 0.1 | — | — | — | — | — | — |
| Starpol Starch Sol. | 0.5 | — | — | — | — | — | — |
| Saturated Solution of Epsom Salt, No. of Drops | — | — | — | — | 3 | 6 | 9 |
| Water | 82.5 | 60 | 70 | 70 | 82.5 | 82.5 | 82.5 |

Table VI that follows shows the chemical composition of the various frits used in the foregoing examples.

TABLE VI

| Frit: | A | B | C | D | E | F | G | H | I |
|---|---|---|---|---|---|---|---|---|---|
| Type: | Borosilicate | | Barium Borosilicate | Lead Borosilicate | | Sodium Borosilicate | Lead Silicate | Zinc Borosilicate | |

TABLE VI-continued

| Frit: | A | B | C | D | E | F | G | H | I |
|---|---|---|---|---|---|---|---|---|---|
| Approximate Melting Point, °F.: | 1500 | 1300 | 1200 | 1500 | 770 | N.A.* | 1300 | 1300 | 1070 |
| Chemical Analysis (Supplier's Data) | | | | | | | | | |
| Silica ($SiO_2$) | 59.0% | 51.5% | 53.5% | 40.6% | 11.6% | 40.8% | 30.4% | 21.4% | 20.9% |
| Alumina ($Al_2O_3$) | 3.0 | 3.8 | 6.3 | 3.5 | — | 1.8 | — | 2.8 | 3.4 |
| Titania ($TiO_2$) | — | — | — | — | — | 1.0 | — | — | 2.1 |
| Lime (CaO) | — | 4.1 | 7.3 | 6.0 | — | 10.3 | — | 4.2 | 4.3 |
| Magnesia (MgO) | 4.0 | — | — | 0.3 | — | — | — | — | — |
| Soda ($Na_2O$) | 2.0 | 6.5 | 3.8 | 2.4 | — | 12.9 | 1.7 | 11.5 | 8.8 |
| Potash ($K_2O$) | 2.0 | 2.0 | 0.2 | 1.8 | — | 0.8 | — | — | — |
| Lithia ($Li_2O$) | 1.0 | 2.3 | — | — | — | 4.3 | 1.0 | 1.3 | 0.4 |
| Zinc Oxide (ZnO) | 4.0 | 1.4 | — | — | — | — | — | 33.0 | 28.6 |
| Boron Oxide ($B_2O_3$) | 25.0 | 26.1 | 8.0 | 13.8 | 13.1 | 19.2 | 5.4 | 25.9 | 24.1 |
| Lead Oxide (PbO) | — | — | — | 31.7 | 75.4 | — | 61.5 | — | — |
| Barium Oxide (BaO) | — | 2.5 | 19.8 | — | — | 8.9 | — | — | 4.3 |
| Fluoride ($F_2$) | — | — | — | — | — | — | — | — | 2.9 |
| Total | 100.0% | 100.2% | 98.9% | 100.1% | 100.1% | 100.0% | 100.0% | 100.1% | 99.8% |

*N.A. means data not available

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A fluxed mix for forming an oxidation-resistant glaze coating on a carbon-containing refractory shape consisting essentially of a zinc borosilicate frit, a clay, and a water-soluble acrylic resin.

2. The fluxed mix of claim 1 containing about 90% by weight zinc borosilicate and correspondingly about 10% by weight of clay, and, for each 100% by weight of said borosilicate and clay, about 4 to 5% by weight of a water-soluble acrylic resin.

3. The fluxed mix of claim 1 wherein said clay is a crude ball clay.

4. The fluxed mix of claim 2 wherein said clay is a crude ball clay.

5. The fluxed mix of claim 1, 2, 3, or 4 wherein said borosilicate and clay are in the form of −325 mesh powders.

6. The fluxed mix of claim 1, 2, 3, or 4 wherein said fluxed mix is in the form of a suspension in water.

* * * * *